July 1, 1941.                J. M. ROPER                 2,247,409
                       ULTRAVIOLET INSTRUMENT LAMP
                          Filed Oct. 9, 1940

INVENTOR
JOHN M. ROPER
BY
W. Glenn Jones
ATTORNEY

Patented July 1, 1941

2,247,409

UNITED STATES PATENT OFFICE 2,247,409

ULTRAVIOLET INSTRUMENT LAMP

John M. Roper, Washington, D. C.

Application October 9, 1940, Serial No. 360,439

2 Claims. (Cl. 176—1)

(Granted under the act of March 3, 1883, as amended April 30, 1928; 370 O. G. 757)

This invention relates to an ultraviolet instrument lamp, and has for an object to provide an improved ultraviolet instrument lamp capable of use on vehicles, particularly airplanes, in conjunction with the conventional power system already available on the vehicle and cooperating with the instruments which bear indications painted with radium or fluorescent paints which are adapted to be visible in the dark when activated by a sufficiently strong ultraviolet light.

A further object of this invention is to provide an ultraviolet instrument lamp which is incandescent in character and does not need the presence of any mercury or other vapor or gas to provide the necessary quantity of ultraviolet light.

Still a further object of this invention is to provide an ultraviolet instrument lamp which is light in weight, and thus does not appreciably add to the amount of weight to be carried by the vehicle, additional weight being critical in both heavier than and lighter than air vehicles, it being realized that there are a considerable number of instruments used on air vehicles, and although the difference in weight per individual lamp may not be much, the difference in weight for the total number of lamps that may be involved is considerable.

A further object of this invention is to provide an ultraviolet instrument lamp wherein a maximum amount of ultraviolet light is concentrated in a particular area, that is, on the instrument face, and a very slight amount of visible light, possibly sufficient only to silhouette the outline of the instrument, is likewise transmitted thereto.

Still a further object of this invention is to provide an ultraviolet instrument lamp wherein the lamp is provided with an external reflecting surface about a portion of the bulb so as to concentrate and control the direction of the ultraviolet light to the desired area only, the ultraviolet light being produced by an incandescent filament operating through a lamp bulb made of any of the well known ultraviolet transmitting glasses, such as Corex glass, or other special glasses known to the trade, whereby the reflected portion of the light from the filament passes through three thicknesses of ultraviolet transmitting glass, thereby substantially eliminating all visible light therefrom, while the direct rays from the filament pass through but a single thickness of transmitting glass, thereby including a very faint portion of visible light therewith.

A further object of this invention is to provide an incandescent filament ultraviolet lamp which can be utilized in the conventional power system of an airplane vehicle and does not cause any more current drain thereon than any ordinary instrument lamp of similar voltage, as contrasted with the gas type of ultraviolet lamps, such as exemplified, for instance, in U. S. patent to Zecher, 1,951,116.

While this light is intended for use in conjunction with instruments such as usually form part of the instrument board, it will be understood that the term "instrument" also includes control members, maps, or any other parts of the vehicle used in conjunction with the operation of the vehicle that may have portions painted or printed with ultraviolet activated paints or inks.

With the foregoing and other objects in view, the invention consists in the construction, combination and arrangement of parts hereinafter described and illustrated in the drawing, in which.

Figure 1:
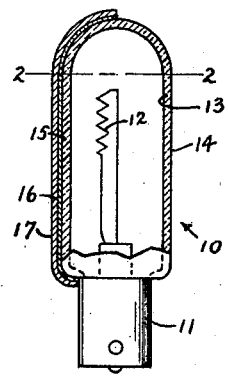
Fig. 1 is a sectional view through one form of ultraviolet lamp of this invention.
Figure 2:
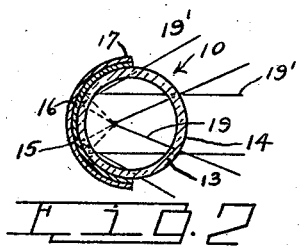
Fig. 2 is a sectional view on line 2—2 of Fig. 1, showing the path of the light.
Figure 3:
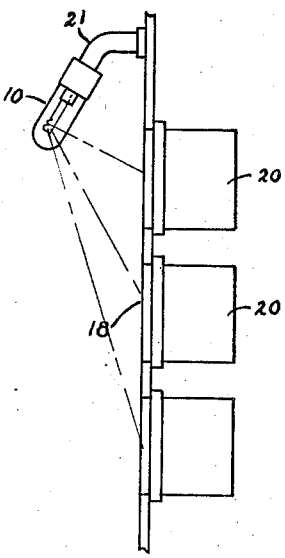
Fig. 3 is a fragmentary view showing the lamp of Fig. 1 in operative position.

There is shown at 10 the instrument lamp of this invention, consisting of a conventional base 11 through which extends the customary electrode leading to the incandescent filament 12, which, it will be observed in Figs. 1 and 2, is mounted off-center from the lamp bulb 13, in a manner similar to that shown in U. S. patent to Biggs, 2,158,561. In this case the lamp bulb 13 is made of ultraviolet transmitting glass such as Corex, or other glasses known to the trade. In order that such glass may filter out substantially all of the visible light and transmit only ultraviolet light, the glass must be of a fixed thickness, usually from ⅛" to 3/16" of an inch. The glass 13 of this lamp, however, will be only one-third of this necessary thickness, as a result of which one portion 14 of the glass will transmit a faint amount of visible light therethrough from the rays 19 coming directly from the incandescent filament 12. Another portion 15 of the lamp bulb 13 is exteriorly coated at 16 with a suitable reflecting material such as silver, nickel, chromium or other suitable reflecting material, which, if desired, may have a protective coating 17 thereover to prevent the reflecting material from being marred.

Light rays 19' coming from the incandescent filament 12 travelling to the portion 15 travels through this portion 15 to the reflecting surface of the material 16, and then are reflected back through this portion 15 and then through portion 14 in the desired direction to the faces 18 of the instruments 20, when the lamp 10 is mounted in a suitable bracket as at 21. The faint portion of visible light coming directly from the filament 12 as at 19, may be sufficient to silhouette the outlines of the instruments 20 without, however, providing any substantial amount of visibility thereto.

The reflected light rays from the portion 15 thus pass through three thicknesses of ultraviolet filtering glass, while the direct rays pass through a single thickness of filtering glass, thus providing sufficient ultraviolet light to make the indications on the faces 18 of instruments 20 clearly visible to the operator without allowing any substantial amount of visible light to reach the instruments' faces, and thus interfere with the operator's visual abilities.

As thus constructed, the incandescent filament 12 is of such low voltage that it does not cause any appreciable current drain on the vehicle power system, thus eliminating the necessity of additional generators and additional batteries on the vehicle, as would be necessary with any present known type of ultraviolet lamp.

Figure 4:
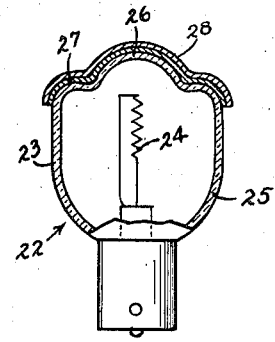
Fig. 4 is a partly sectional view of another form of lamp.
Figure 5:
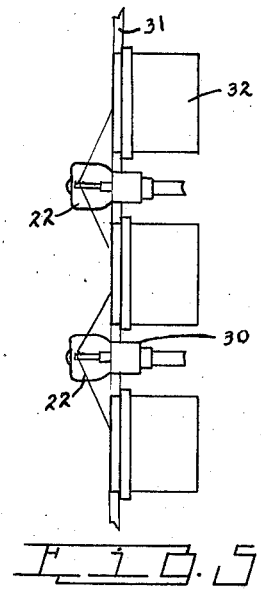
Fig. 5 shows the lamp of Fig. 4 in operative position.

In Figs. 4 and 5 there is shown a lamp 22 differing in shape from that at 10, but otherwise identical in construction and operation. In the lamp 22 the bulb 23 has a filament 24 located in the center with the lower portion 25 of the lamp uncoated, while the top portion 26 is provided with an external reflecting coating 27 and possibly a reflecting material protective coating 28. In this case the lamp is mounted in the bracket 30 extending through the instrument board 31 in which are mounted the instruments 32.

Other modifications and changes in the proportions and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A non-gaseous ultraviolet lamp comprising a filament, a lamp bulb of ultraviolet transmitting and visible light absorbing properties, said bulb being of a thickness to substantially absorb the greater portion of but not all of the visible light from the filament, and a reflecting surface externally coated over only a portion of said lamp bulb to reflect the ultraviolet light and direct the remaining light in a desired direction only through the remaining uncoated portion, whereby the reflected light passes through three thicknesses of ultraviolet transmitting bulb to absorb substantially all of the visible light thereof and the direct light passes through a single thickness of the bulb to include a small portion of visible light therewith.

2. An incandescent ultraviolet lamp comprising an incandescent filament, a lamp bulb of ultraviolet transmitting and visible light absorbing properties, said bulb being of a thickness to substantially absorb the greater portion of but not all of the visible light from the incandescent filament, and a reflecting surface externally coated over only a portion of said lamp bulb to reflect the ultraviolet light and direct the remaining light in a desired direction only through the remaining uncoated portion, whereby the reflected light passes through three thicknesses of ultraviolet transmitting bulb to absorb substantially all of the visible light thereof and the direct light passes through a single thickness of the bulb to include a small portion of visible light therewith.

JOHN M. ROPER.